United States Patent
Gligorijevic et al.

(10) Patent No.: US 11,868,886 B2
(45) Date of Patent: Jan. 9, 2024

(54) TIME-PRESERVING EMBEDDINGS

(71) Applicant: Verizon Media Inc., New York, NY (US)

(72) Inventors: Jelena Gligorijevic, San Jose, CA (US); Ivan Stojkovic, San Jose, CA (US); Martin Pavlovski, Philadelphia, PA (US); Shubham Agrawal, San Jose, CA (US); Djordje Gligorijevic, San Jose, CA (US); Srinath Ravindran, Santa Clara, CA (US); Richard Hin-Fai Tang, Saratoga, CA (US); Shabhareesh Komirishetty, Sunnyvale, CA (US); Chander Jayaraman Iyer, Santa Clara, CA (US); Lakshmi Narayan Bhamidipati, Sunnyvale, CA (US)

(73) Assignee: Yahoo Assets LLC, New York, NY (US)

( * ) Notice: Subject to any disclaimer, the term of this patent is extended or adjusted under 35 U.S.C. 154(b) by 385 days.

(21) Appl. No.: 17/157,071

(22) Filed: Jan. 25, 2021

(65) Prior Publication Data

US 2022/0237442 A1 Jul. 28, 2022

(51) Int. Cl.
| | |
|---|---|
| G06N 3/08 | (2023.01) |
| G06F 11/34 | (2006.01) |
| G06F 16/955 | (2019.01) |
| G06F 18/22 | (2023.01) |
| G06F 18/214 | (2023.01) |
| G06F 18/2413 | (2023.01) |
| G06N 3/048 | (2023.01) |

(52) U.S. Cl.
CPC ........... *G06N 3/08* (2013.01); *G06F 11/3438* (2013.01); *G06F 16/9566* (2019.01); *G06F 18/214* (2023.01); *G06F 18/22* (2023.01); *G06F 18/24147* (2023.01); *G06N 3/048* (2023.01); *G06F 2201/835* (2013.01)

(58) Field of Classification Search
None
See application file for complete search history.

(56) References Cited

U.S. PATENT DOCUMENTS

| | | | | |
|---|---|---|---|---|
| 2020/0081975 | A1* | 3/2020 | Yadav | G06F 16/355 |
| 2020/0107072 | A1* | 4/2020 | Lomada | G06N 3/084 |

OTHER PUBLICATIONS

Gligorijevic, Djordje, Jelena Gligorijevic, and Aaron Flores. "Time-aware prospective modeling of users for online display advertising." arXiv preprint arXiv:1911.05100 (2019). (Year: 2019).*

(Continued)

*Primary Examiner* — Eric Nilsson
(74) *Attorney, Agent, or Firm* — Cooper Legal Group LLC

(57) ABSTRACT

One or more computing devices, systems, and/or methods for generating time-preserving embeddings are provided. User trails of user activities performed by users are generated. Frequencies at which the activities were performed are identified. Indices are assigned to a set of activities identified from the activities as having frequencies above a threshold. Activity descriptions of the set of activities are mapped to the indices to generate a vocabulary. A model is trained using the user trails, timestamps of the activities, and the vocabulary to learn a set of time-preserving embeddings.

20 Claims, 10 Drawing Sheets

(56) References Cited

OTHER PUBLICATIONS

Pavlovski, Martin, et al. "Time-aware user embeddings as a service." Proceedings of the 26th ACM SIGKDD International Conference on Knowledge Discovery & Data Mining. 2020. (Year: 2020).*

* cited by examiner

TIME-PRESERVING EMBEDDINGS

BACKGROUND

Many different service providers may utilize machine learning functionality, such as models, to perform various tasks related to services provided by the service providers. In an example, a recommendation service provider may utilize a model to predict likelihoods that users will be interested in and/or interact with certain recommendations, such as restaurant recommendations, refrigerator recommendations, videogame recommendations, etc. The model may utilize information about a user (e.g., user features) and/or a recommendation (e.g., content features) to assign a score to the recommendation as to how likely the user would view and/or interact with the recommendation. In this way, available recommendations may be scored, and a recommendation with a highest score may be provided to the user. Models may be utilized by service providers to perform other tasks, such as user related prediction tasks, article and content recommendations, user interaction prediction, user segmentation and lookalike modeling, etc.

SUMMARY

In accordance with the present disclosure, one or more computing devices and/or methods for generating and/or utilizing time-preserving embeddings are provided. Users may perform various activities that may be tracked by service providers within data sources as activity data (events). The activity data may correspond to search queries submitted by the users, messages sent and received by the users (e.g., emails, text messages, etc.), social network messages/posts, websites visited by the users, locations visited by the users, purchases made by the user, content viewed by the users, and content interactions where users interact with particular content such as notifications, recommendations, links to websites or services, etc. Accordingly, the activity data may be extracted from the data sources as user trails of activities performed by the users. For example, a user trail of a user may correspond to activities performed by the user over a particular timespan (e.g., a single session of the user interacting with a computing device, an hour, a day, a week, or some other timespan). The user trail my indicate that the user submitted a search query "best stoves," then visited an appliance website, and then used a banking application to check a savings account balance, sent an email to an email address specified by the appliance website, and finally posted a social network post asking for recommendations on stoves. In this way, user trails may correspond to activities performed in a certain order at particular times by users utilizing various devices and/or services.

Frequencies at which the activities were performed are identified. For example, the frequencies at which the activities were performed may correspond to performance of the activities over a certain time period, such as a day, a week, a month, a year, 13 months, etc. A set of activities having frequencies above a threshold may be identified. For example, a K-top most frequent activities may be identified as the set of activities, where K may be 200,000 or any other number. In this way, a large amount of data (e.g., 13 months of user activity data from multiple data sources, which may correspond to billions of activities and/or dimensions of data) may be reduced down to a much smaller amount of data to process, which reduces computational resource utilization and overhead, such as by merely processing a few hundred thousand activities.

Activity descriptions of the set of activities may be mapped to indices assigned to the set of activities to generate a vocabulary. For example, a first index of the set of activities may be mapped to a description of the search query "best stoves," a second index may be mapped to a description of the appliance website, etc.

A model may be trained using the user trails, timestamps of the activities, and/or the vocabulary. The model may be trained to learn/generate a set of time-preserving embeddings. As part of training the model a set of learned parameters may be generated. In some embodiments, the set of time-preserving embeddings may correspond to fixed length numerical vectors representing collections of temporally distributed user events (e.g., M-dimensional continuous vectors, such as where M corresponds to 100 dimensions or any other number of dimensions). In this way, the set of time-preserving embeddings correspond to fixed length vector representations that reflect sequential and temporal dependencies among activities (events). The set of time-preserving embeddings are generated in a task independent manner so that the set of time-preserving embeddings can be leveraged for performing a wide variety of different types of tasks, such as user related prediction tasks, article and content recommendations, user interaction prediction, user segmentation and lookalike modeling, etc. The set of learned parameters may be utilized for embedding incoming activities (e.g., a new set of activities) and/or users (e.g., a new user) into a new set of time-preserving embeddings.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
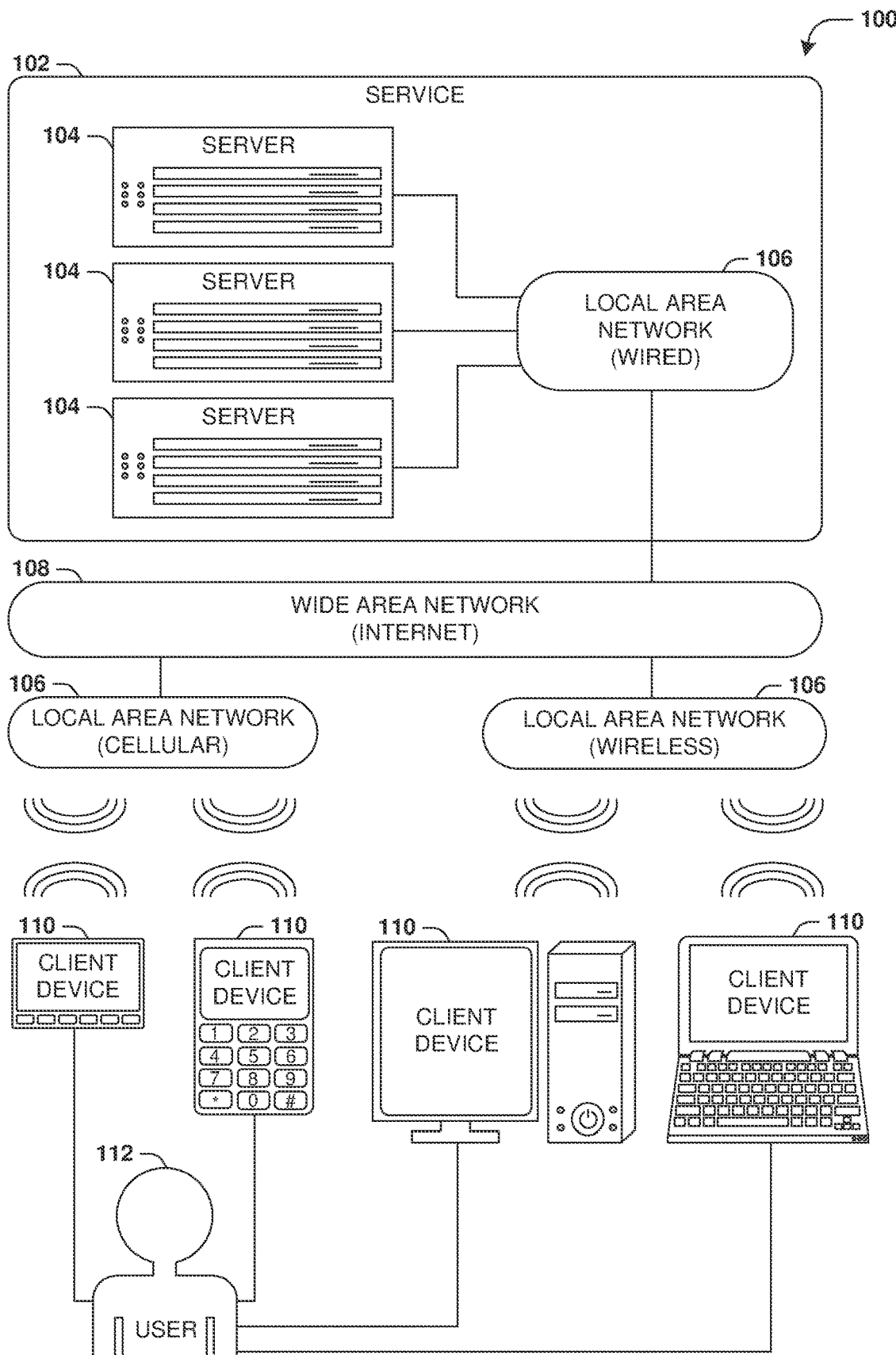
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
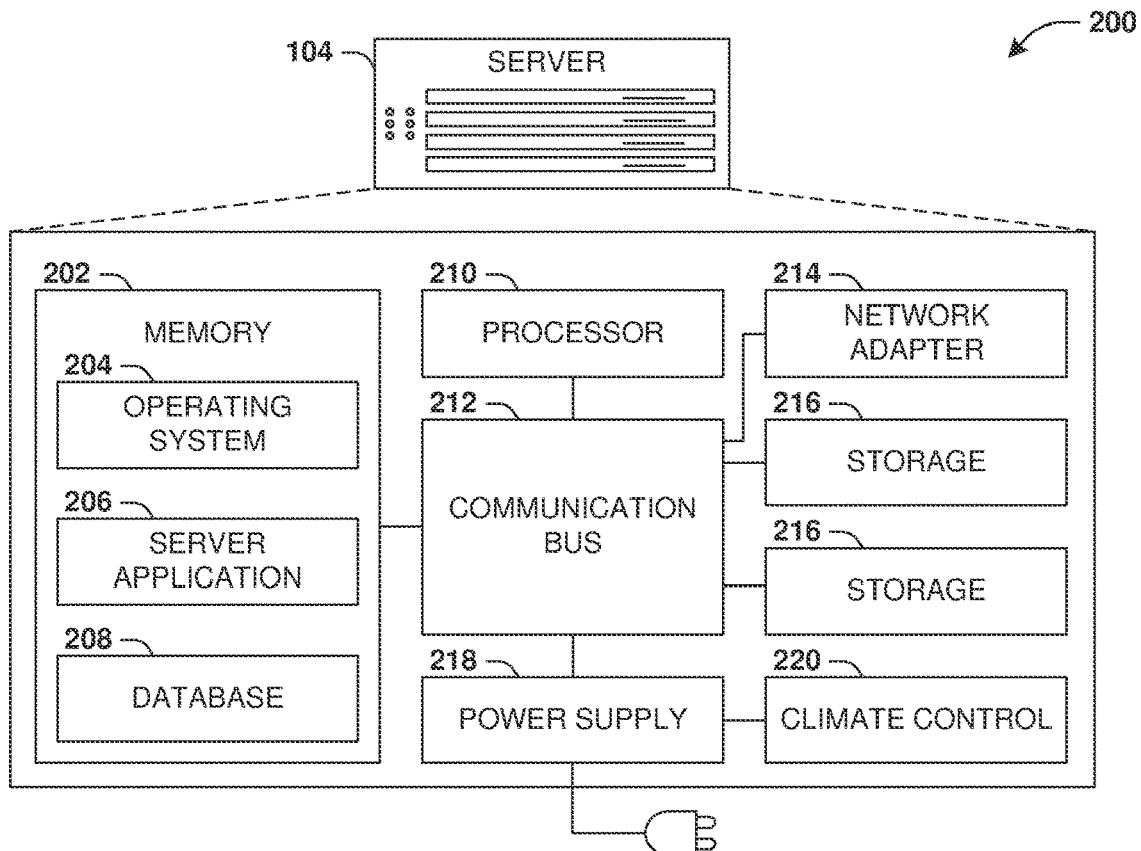
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
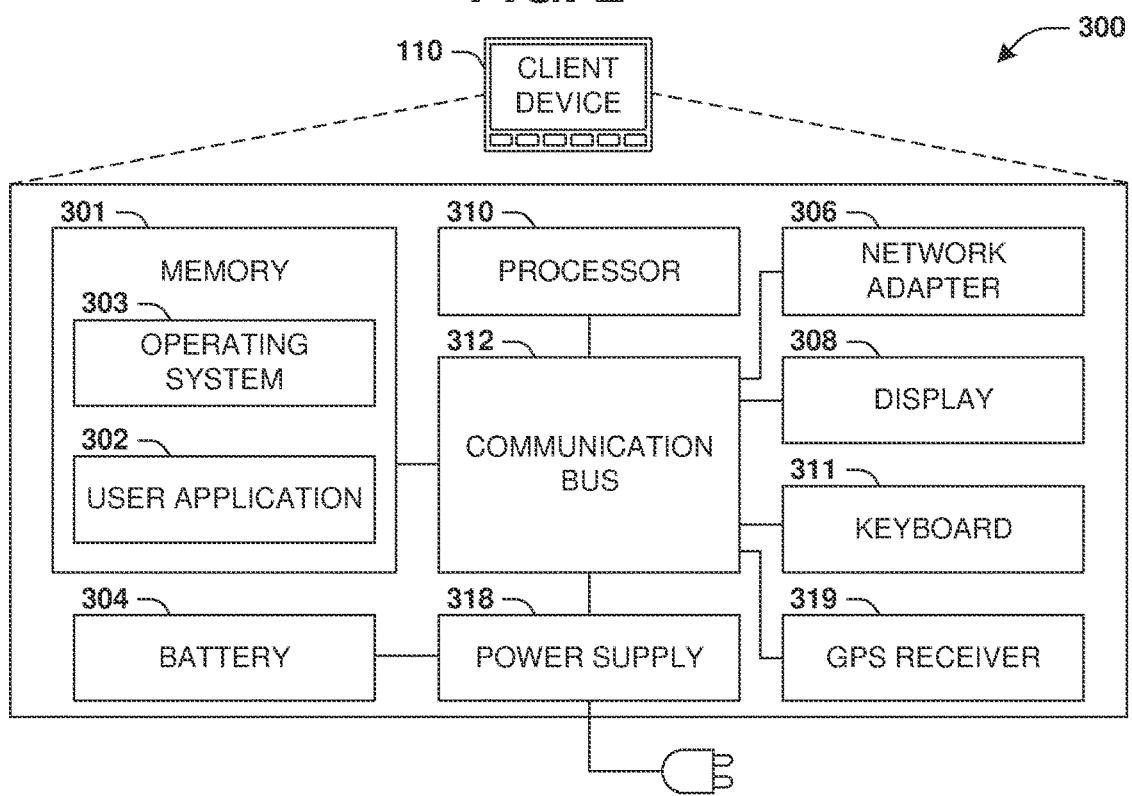
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for generating and/or utilizing time-preserving embeddings are provided. Many types of service providers may utilize machine learning functionality such as custom models that leverage features for performing tasks associated with services provided by the service providers. Such services may correspond to recommendation services, content provider services, services that leverage user prediction information (e.g., predictions as to likelihoods users will interact with particular content or perform certain actions after being provided with the content), shopping services, news services, websites, social networks, and/or a wide variety of other services. Significant time, effort, and computing resources may be independently spent by each service to obtain features associated with users and train the custom models based upon those features.

In some instances, merely a few features may be readily available to a service provider, such as gender and age. Using merely the few readily available features will result in the training of a very inaccurate model that may output a lot of wrong predictions (e.g., the model may predict that users have an interest in a particular product, but the users may actually have little interest in the product). In other instances, high-dimensional user representations corresponding to billions of activities as features may be derived, which requires an extensive amount of time, effort, and computing resources for deriving the high-dimensional user representations and training a model based upon the high-dimensional user representations. The readily available features and high-dimensional user representations do not take into account the time-varying nature of user activities (e.g., a user may submit a search query regarding appliances, and then 5 minutes later send an email about refrigerators), which will also result in the trained model being inaccurate and/or unable to output correct predictions.

Because each service provider independently obtains features, trains models, and/or processes data, a substantial amount of computing resources are wasted. Computing resources are wasted because of the redundant and duplicative effort by each service provider independently performing specialized and tailored feature engineering for feature generation and model training and execution.

Accordingly, as provided herein, time-preserving embeddings are generated from user trails of activities performed by users. The time-preserving embeddings are task/service independent and take into account sequential and temporal dependencies of the activities so that the time-preserving embeddings can be utilized by any type of service to perform any type of task. The tasks may be performed more accurately because the time-preserving embeddings can be used to train models to be more accurate by taking into account the sequential and temporal dependencies of the activities.

Online user activities of users performing various actions may be tracked by service providers within data sources, such as users sending/receiving messages, performing searches, posting to social networks, making purchases, viewing websites, reading articles, watching videos, viewing images, visiting a physical location, receiving a receipt, etc. The user activities may be performed at certain times and have a particular sequence/order with respect to one another. The user activities may be obtained from the data sources, and used to generate user trails of activities performed by users at particular times and according to a particular ordering with respect to one another.

A model, such as a time aware sequential autoencoder model, may be trained based upon activities within the user trails, timestamps of the activities, and a vocabulary corresponding to activity descriptions mapped to indices of frequently performed activities. The time aware sequential autoencoder model may be trained to learn time-preserving representations of a collection of temporally distributed user activities (events) in an unsupervised manner that is task agnostic in order to generate time-preserving embeddings that are fixed-length numerical vectors describing users and/or activities. In this way, the time aware sequential autoencoder model encodes the input data into the time-preserving embeddings that reflect sequential and temporal dependencies amongst the activities (events), and thus the time aware sequential autoencoder model can enforce learning of sequential and temporal dependencies among the activities. Temporal information (e.g., ordering of activities and also when the activities occurred) is encoded utilizing a temporal score function (e.g., a parameterized sigmoid function) to weight the effect of different activities and to learn and automatically tune parameters.

In some embodiments, the time-preserving embeddings may be stored within a central repository accessible to various services that may utilize the time-preserving embeddings for training and/or executing different types of models to perform a wide variety of tasks. In this way, the time-preserving embeddings are readily accessible for many problem formulations and are seamlessly applicable to different services, such as where a service provider can merely append the time-preserving embeddings to typical model input (e.g., features) used by models employed by the service provider. The time-preserving embeddings are generated in a task-independent manner so the time-preserving embeddings are not biased towards a particular use case, task, or service. The time-preserving embeddings may be utilized for a variety of use cases, such as click/conversion prediction, user segmentation, lookalike modeling, user prediction or other type of predictive tasks, recommendations of news, articles, products, services, etc.

The time-preserving embeddings reduce and/or avoid the burden of independent (task-driven) feature engineering, redundant feature preprocessing and processing across multiple service providers, and/or having to obtain consent on a case-by-case basis by each service provider. This is because a repository of time-preserving embeddings may be maintained so that any service provider can selectively utilize certain time-preserving embeddings for performing any particular task. This reduces computing resource consumption and effort otherwise wasted by each service provider independently constructing features to use by their models for performing different tasks since a single repository of time-preserving embeddings may be readily available to the service providers. Furthermore, the time-preserving embeddings may be relatively low dimensional (e.g., 100 dimensions or some other number of dimensions) compared to merely utilizing, without discretion or selectivity, the billions of features and activities that are available from the data sources. This further reduces computational overhead and computing resources usage. For example, substantially less computing resources are consumed by processing time-preserving embeddings (vectors) with around 100 dimensions compared with billions of features and activities. The service provider can leverage the time-preserving embeddings to output more accurate results (e.g., more accurate predictions used to provide users with recommendations that may be more relevant to such users) because the time-preserving embeddings take into account sequential and temporal decencies among activities (events). This improves the accuracy of conventional models employed by the services.

Figure 4:
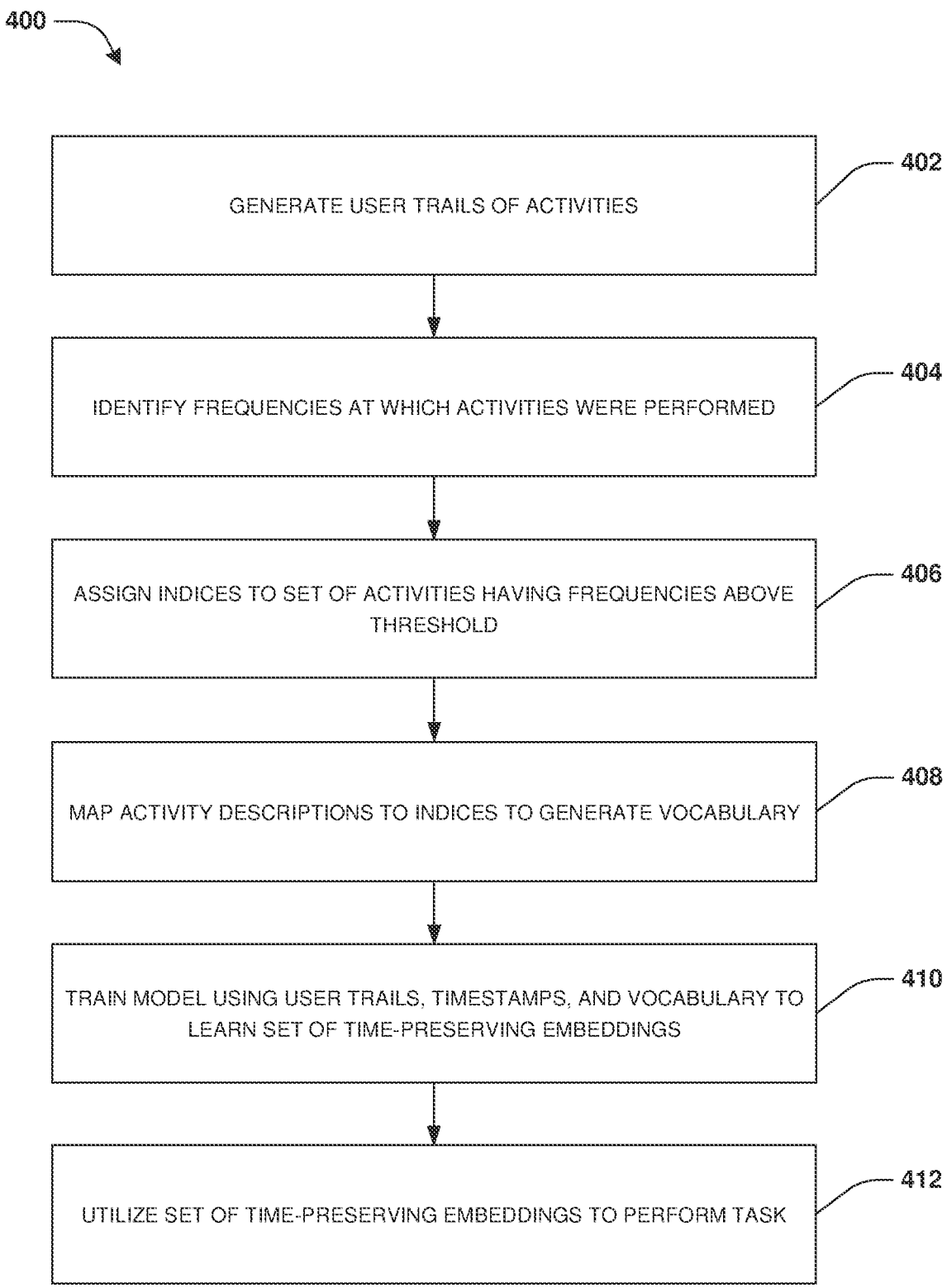
FIG. 4 is a flow chart illustrating an example method for generating time-preserving embeddings.

One embodiment of generating and/or utilizing time-preserving embeddings is illustrated by an exemplary method 400 of FIG. 4 and is further described in conjunction with system 500 of FIGS. 5A-5F. Users may utilize various computing devices, such as mobile devices, smart watches, tablets, videogame consoles, computers, laptops, wearable devices, televisions, vehicle computers, etc., to access services that may be provided by service providers to the computing devices over a network. The service providers may provide a wide variety of services to the users, such as access to websites, search engine functionality, locational navigation functionality, access to content (e.g., images, articles, videos, etc.), social network access, purchase functionality to purchase products and services, email and other messaging functionality, and/or a wide variety of other functionality and services.

Figure 5A:
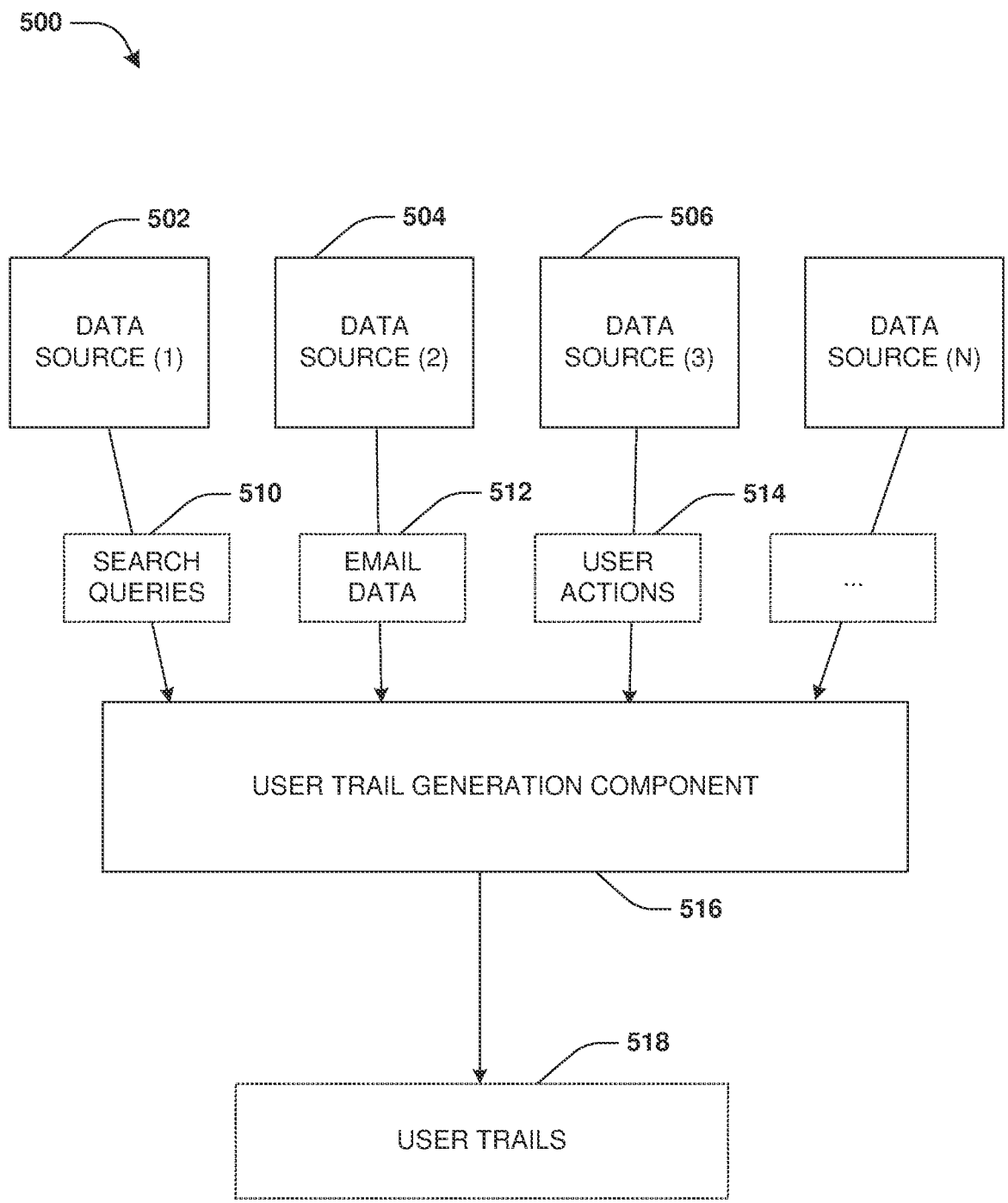
FIG. 5A is a component block diagram illustrating an example system for generating time-preserving embeddings, where user trails are generated.

Accordingly, users may perform various activities that may be tracked by the service providers and/or the computing devices within data source, such as a first data source 502 associated with a first service provider that provides a first service, a second data source 504 associated with a second service provider that provides a second service, a third data source 506 associated with a third service provider that provides a third service, etc., as illustrated by FIG. 5A. Such activities may correspond to search queries submitted by a user, websites visited by the user, receipts provided to the user such as through email, content viewed by the user (e.g., images, videos, articles, etc.), recommendations provided to the user and/or actions performed by the user in response to being provided with the recommendations (e.g., a user is shown a recommendation for a lawn service, and the user either ignored the recommendation, visited a website associated with the lawn service, or created an account with the lawn service), etc. Such activities may also correspond to social network posts by the user, emails sent/received by the user, text messages sent/received by the user, content interactions and actions performed by the user, global positioning system (GPS) location data indicative of locations visited by the user, etc. It may be appreciated that the user may provide opt-in consent for the service providers to track, store, and/or make available such activity data for the purpose of generating time-preserving embeddings, and that personal information of such users may be removed before the generation of the time-preserving embeddings.

In an example, the first service provider may provide search engine functionality through which users can submit search queries 510 and obtain search results for the search queries 510. The first service provider may store the search queries 510 within the first data source 502 as activities performed by the users, which may include various information such as identifying information of the users, search queries performed by the users, timestamps of the search queries being received, search results, and/or other information.

In an example, the second service provider may provide email functionality through which users send and receive emails. The first service provider may store email data 512 within the second data source 504 as activities. The email data 512 may comprise information about the senders, recipients, attachments, subject lines, email body text and data, actions performed upon the email (e.g., marking an email as spam, reading an email, clicking a link within an email, deleting an email without reading the email, etc.), timestamps of the emails and of the actions, etc.

In an example, the third service provider may provide a computing environment (e.g., an application, a website, an operating system, a mobile operating system, etc.) through which users may perform actions. The first service provider may store user actions 514 within the third data source 506 as activities. The user actions 514 may correspond to users visiting a website, users making purchases of items or services, users viewing social network content, users viewing images or videos, and/or a wide variety of other actions a user may perform through a computing device or associated with the computing device (e.g., traveling to a particular location of interest while wearing a smart watch that tracked the trip).

A user trail generation component 516 may be configured to retrieve user activity data from the data sources used by the service providers to store the activity data. For example, the user trail generation component 516 may retrieve search queries 510 performed over a particular timespan from the first data source 502 associated with the first service provider. The user trail generation component 516 may retrieve email data 512 associated with a particular timespan from the second data source 504 associated with the second service provider. The user trail generation component 516 may retrieve user actions 514 performed over a particular timespan from the third data source 506 associated with the third service provider. The user trail generation component 516 may retrieve other activity data (events) from other data sources.

During operation 402 of FIG. 4, user trails 518 may be generated from activities performed by users. In some embodiments, the user trail generation component 516 generates the user trails 518 as sequences of activities performed by users. The user trail generation component 516 may identify these activities from the user activity data retrieved by the user trail generation component 516 from the first data source 502, the second data source 504, the third data source 506, and/or other data sources. For example, the user trail generation component 516 may determine that a first user submitted a search query "top stove brand" at a first point in time, as a first activity. Subsequently, the first user visited an appliance review website at a second point in time, as a second activity subsequent the first activity. Next, the first user submits a search query "stove model ABC sales" at a third point in time, as a third activity subsequent the second activity. After, the first user posts a social network posts "does anyone like stove model ABC?" at a fourth point in time, as a fourth activity subsequent the third activity. Finally, the first user may visit an appliance store, which is tracked using GPS data of a mobile device as a fifth activity subsequent the fourth activity, and purchases a stove model D, which is identified by an email receipt to the user and is tracked as a sixth activity subsequent or contemporaneous to the fifth activity.

A user trail for the user may be generated by the user trail generation component 516 based upon the first activity, the second activity, the third activity, the fourth activity, the fifth activity, and the sixth activity. These activities may be grouped into the user trail based upon the activities occurring within a threshold timespan of one another or within an overall timespan. In this way, one or more user trails corresponding to various timespans may be generated from activities performed by the user. Other user trails may be generated by the user trail generation component 516 for other users based upon activities perform by the other users over particular timespans. For example, the user trail generation component 516 may determine that a second user sent an email regarding hardwood floor installation to a coworker at a first point in time, as a first activity. Subsequently, the second user downloaded a home renovation idea mobile app onto a mobile device at a second point in time, as a second activity subsequent the first activity. After, the second user may have called a phone number associated with a hardwood floor installer at a third point in time, as a third activity subsequent the second activity. Finally, the second user may have submitted a payment to the hardwood floor installer at a fourth point in time, as a fourth activity subsequent the third activity. A user trail for the second user may be generated by the user trail generation component 516 based upon the first activity, the second activity, the third activity, and the fourth activity. These activities may be grouped into the user trail based upon the activities occurring within a threshold timespan of one another or within an overall timespan. In this way, one or more user trails corresponding to various timespans may be generated from activities performed by the second user. In some embodiments, a user trail may comprise an activity description, user information, a timestamp of when an activity was performed, and/or a variety of other information.

Figure 5B:
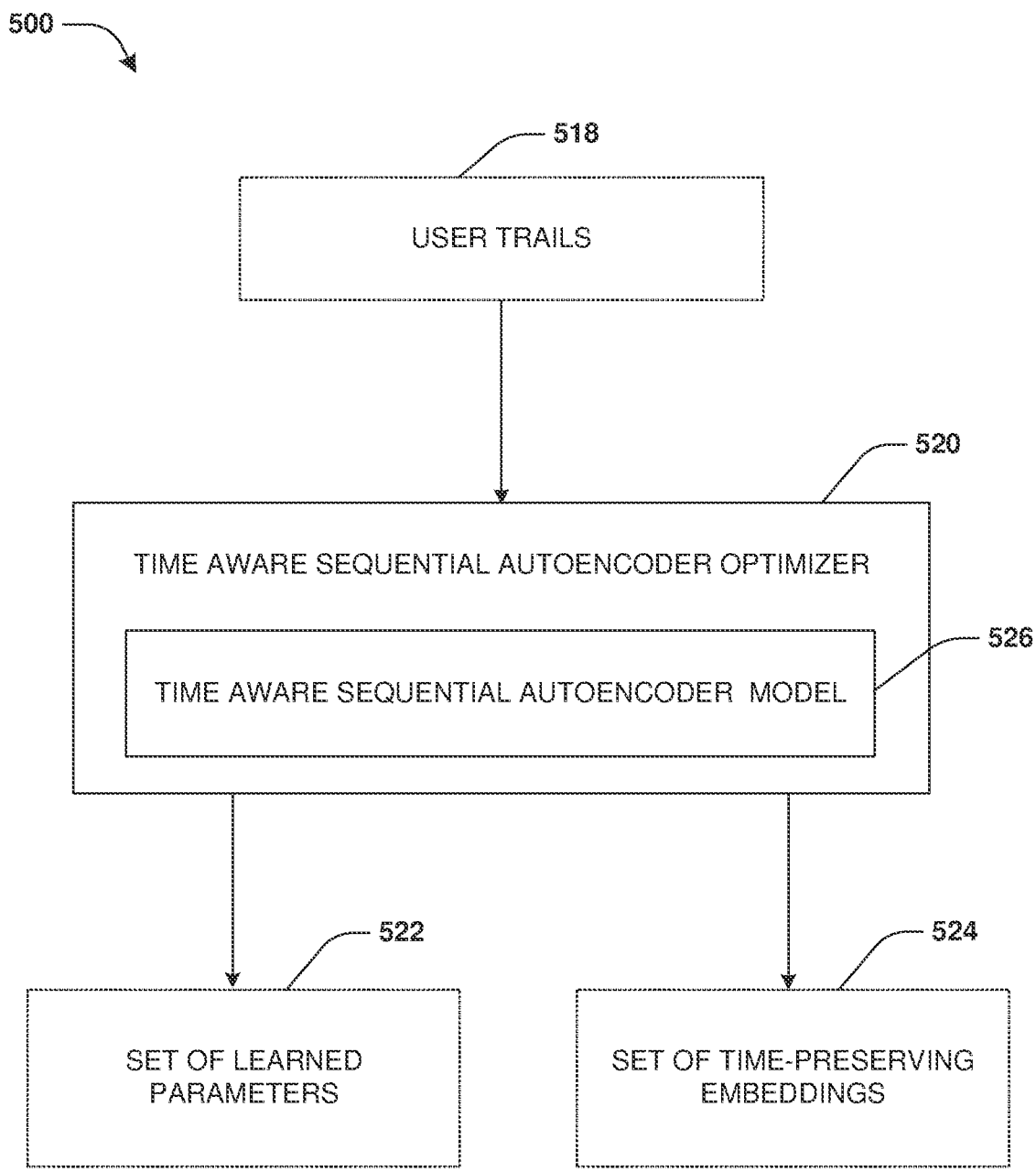
FIG. 5B is a component block diagram illustrating an example system for generating time-preserving embeddings, where time-preserving embeddings and a set of learned parameters are generated.

A time aware sequential autoencoder optimizer 520 may be configured to utilize the user trails 518 to train a model such as a time aware sequential autoencoder model 526, as illustrated by FIG. 5B. In some embodiments, the user trails 518 may correspond to activities of users over a particular timespan (e.g., within the past 13 months, a year, a month, a week, etc.). As part of training the time aware sequential autoencoder model 526, the time aware sequential autoencoder optimizer 520 may identify frequencies at which the activities within the user trails 518 were performed, during operation 404 of FIG. 4. For example, the time aware sequential autoencoder optimizer 520 may evaluate activity descriptions of the activities within the user trails 518 in order to maintain a count of how many times each unique activity occurred, such as how many times users sent emails about stove model ABC, how many times users visit a particular website, how many times users sent emails about buying flooring from a hardware flooring company, how many times users purchase a service after viewing a recommendation for the service, and/or other activities, occurring over the timespan, within the user trails 518.

As part of training the time aware sequential autoencoder model 526, the time aware sequential autoencoder optimizer 520 may identify a set of activities from the user trails 518 based upon the set of activities having frequencies above a threshold, such as a top-K most frequent activities (e.g., K being 150,000, 200,000, 250,000 or any other number). During operation 406 of FIG. 4, the time aware sequential autoencoder optimizer 520 may assign indices to the set of activities identified from the activities of the user trails 518 as having frequencies of occurrence above the threshold.

During operation 408 of FIG. 4, the time aware sequential autoencoder optimizer 520 may map activity descriptions of the set of activities to in the indices. For example, a description of a first activity within the set of activities may be mapped to a first index assigned to the first activity, a second activity within the set of activities may be mapped to a second index assigned to the second activity, etc. The activity descriptions are mapped to the indices to generate a vocabulary.

During operation 410 of FIG. 4, the time aware sequential autoencoder optimizer 520 trains the time aware sequential autoencoder model 526. In some embodiments, the time aware sequential autoencoder optimizer 520 may train the time aware sequential autoencoder model 526 utilizing the user trails 518. In some embodiments, the time aware sequential autoencoder optimizer 520 may train the time aware sequential autoencoder model 526 utilizing timestamps of the activities within the user trails 518. The timestamps may correspond to when each activity was performed. In some embodiments, the time aware sequential autoencoder optimizer 520 may train the time aware sequential autoencoder model 526 utilizing the vocabulary. The time aware sequential autoencoder optimizer 520 trains the time aware sequential autoencoder model 526 to learn a set of time-preserving embeddings 524. In this way, the time aware sequential autoencoder optimizer 520 trains the time aware sequential autoencoder model 526 using unsupervised training to transform the user trails 518 into fix-length numerical vectors as the set of time-preserving embeddings 524 representing collections of temporally distributed user events (activities performed by users).

In some embodiments, the set of time-preserving embeddings 524 may comprise user embeddings describing/representing users. A set of users with activity histories within a similarity threshold may be in a neighboring proximity with respect to one another within an embedding space (e.g., users that performed similar activities may be clustered together within the embedding space, and users that performed dissimilar activities may be clustered separate from one another within the embedding space). In some embodiments, the set of time-preserving embeddings 524 may comprise activity embeddings describing the activities. In some embodiments of activity embeddings, an activity-to-vector may be utilized to train the time aware sequential autoencoder model 526 to understand user activities by identifying semantic relationships between activities. Activity-to-vector is similar to word-to-vector, but users are documents, sessions (e.g., a user session of performing one or more activities) are sentences, and activities are words. Activity-to-vector may be executed upon a sequence of user activities across various types of activities, such as search, content consumption, reservations, purchases, content interactions, user actions, conversions, dotpixels, etc. A vector represents a relationship between activities within a particular activity type, and also across activity types. Thus, there is a sequence of user activities. For each activity, a context at which the activities appear is used in the terms of the sequence of user activities. In this way, there are similar activities in terms of context, which will be relatively close in the embedding space. In some embodiments, an activity embedding may be a vector of numbers. The vector of numbers is weighted by a score, which is multiplied together. If the score is closer to 0, then activity embedding values will also be closer to 0, and thus will have a smaller effect on final user embeddings. In this way, activity embeddings may be weighted to have a greater effect or a smaller effect on user embeddings.

In some embodiments, the set of time-preserving embeddings 524 comprise token based URL embeddings. For examples, URLs may have keywords embedded therein. A sequential denoising autoencoder may be used to reconstruct a word sequence of one or more keywords from the URL, such as if the URL is noisy. In some embodiments, an encoder/decoder architecture is utilized, such as to embed URLs with keywords and/or subsequently cluster similar URLs having similar keywords. In some embodiments, smooth inverse frequency may be utilized. Sentences (URLs) may be represented as weighted averages of pretrained word vectors. Tokens within URLs may be obtained, and corresponding pretrained embeddings may be identified, which may each represent a sentence (URL) as an embedding of individual tokens for generating a meaningful representation of a sentence (URL). This may be applied to short string tokens, such as URLs or other short strings of tokens. If a small set of URLs are labeled, then the labels may be propagated to nearest neighbors (neighboring URLs within the embedding space), thus resulting in categorization of a largest set of URLs (the URLs and neighboring URLs). Token based URL embeddings may be utilized for contextual demographics, automated labeling of URLs, etc.

In some embodiments of training the time aware sequential autoencoder model 526, a temporal score function is utilized to encode temporal information into the set of time-preserving embeddings 524. The temporal score function is utilized to map a time of an event (a time of an activity) to a score. In some embodiments, the temporal score function utilizes a parameterized sigmoid function that outputs the score based upon a sigmoid and one or more trained parameters. In some embodiments, the temporal score function is mapping the time of the event (activity) into a number, such as the score. The parameterized sigmoid function is a function of type sigmoid (e.g., sigmoid=$1/(1+\exp(-x))$) and that the function is parameters with two parameters (e.g., [x=param1+param2*t]) that are also trained along with other parameters of the time aware sequential autoencoder model 526. In an example, an event (activity) occurred one year prior, and thus the time of that event has a certain value (e.g., a relatively lower value due to occurring such a long time ago) relative to a current time/moment at which a user representation of a user associated with the event (e.g., a user that performed the activity) is computed as a user embedding. That value for time is substituted with a temporal score function, and an output score is calculated based on that sigmoid and the two trained parameters. Because the time value was low, the final score may also be low, depending on the trainable parameters.

Figure 5C:
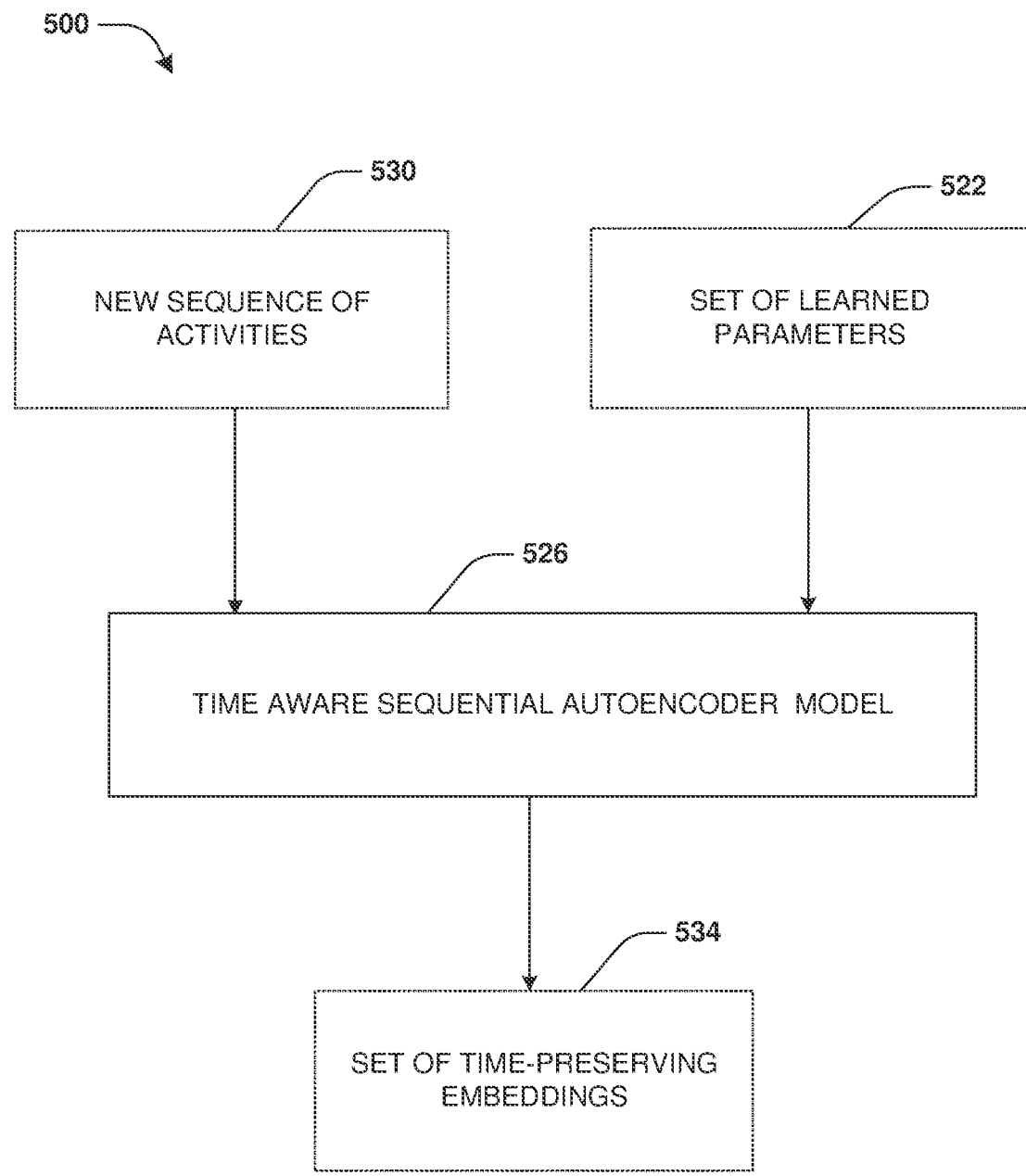
FIG. 5C is a component block diagram illustrating an example system for generating time-preserving embeddings, where time-preserving embeddings are generated.

In some embodiments, a set of learned parameters 522 are generated based upon the time aware sequential autoencoder optimizer 520 training the time aware sequential autoencoder model 526. The set of learned parameters 522 may be utilized by the time aware sequential autoencoder model 526 to embed new sequences of activities, as illustrated by FIG. 5C. For example, a new sequence of activities 530 by one or more users may be identified. The time aware sequential autoencoder model 526 utilizes the set of learned parameters 522 to embed the new sequence of activities 530 as a set of time-preserving embeddings 534. In some embodiments, if an incoming activity of the sequence of activities 530 is a trending activity performed a threshold number of times by a threshold number of users, then the trending activity is included within the vocabulary for a subsequent training of the time aware sequential autoencoder model 526. In some embodiments, if an incoming activity of the sequence of activities 530 is not within the vocabulary, then the incoming activity is not added into the vocabulary until a subsequent update of the vocabulary. In some embodiments, activities, of a user trail of a user, that are within the vocabulary are embedded into the set of time-preserving embeddings 534. Activities of the user trail that are not in the vocabulary are considered during the subsequent update of the vocabulary.

In some embodiments, the time aware sequential autoencoder model 526 may be applied to a user trail of a user (e.g., potentially a new user) to obtain one or more user embeddings as the set of time-preserving embeddings. Activities of the user trail are used to substitute previously learned vector (e.g., numeric) representations of the activities, and then computing a user vector using the time aware sequential autoencoder model 526. In this way, the time aware sequential autoencoder model 526 may utilize the set of learned parameters 522 to perform various tasks, such as embedding new sequences of activities, embedding users, and/or performing other tasks such as predicting a user interest, predicting a likelihood a user will perform an action, generating a recommendation to provide a user, predicting a likelihood that a user will interact with content, user segmentation, user lookalike modeling, etc.

Figure 5D:
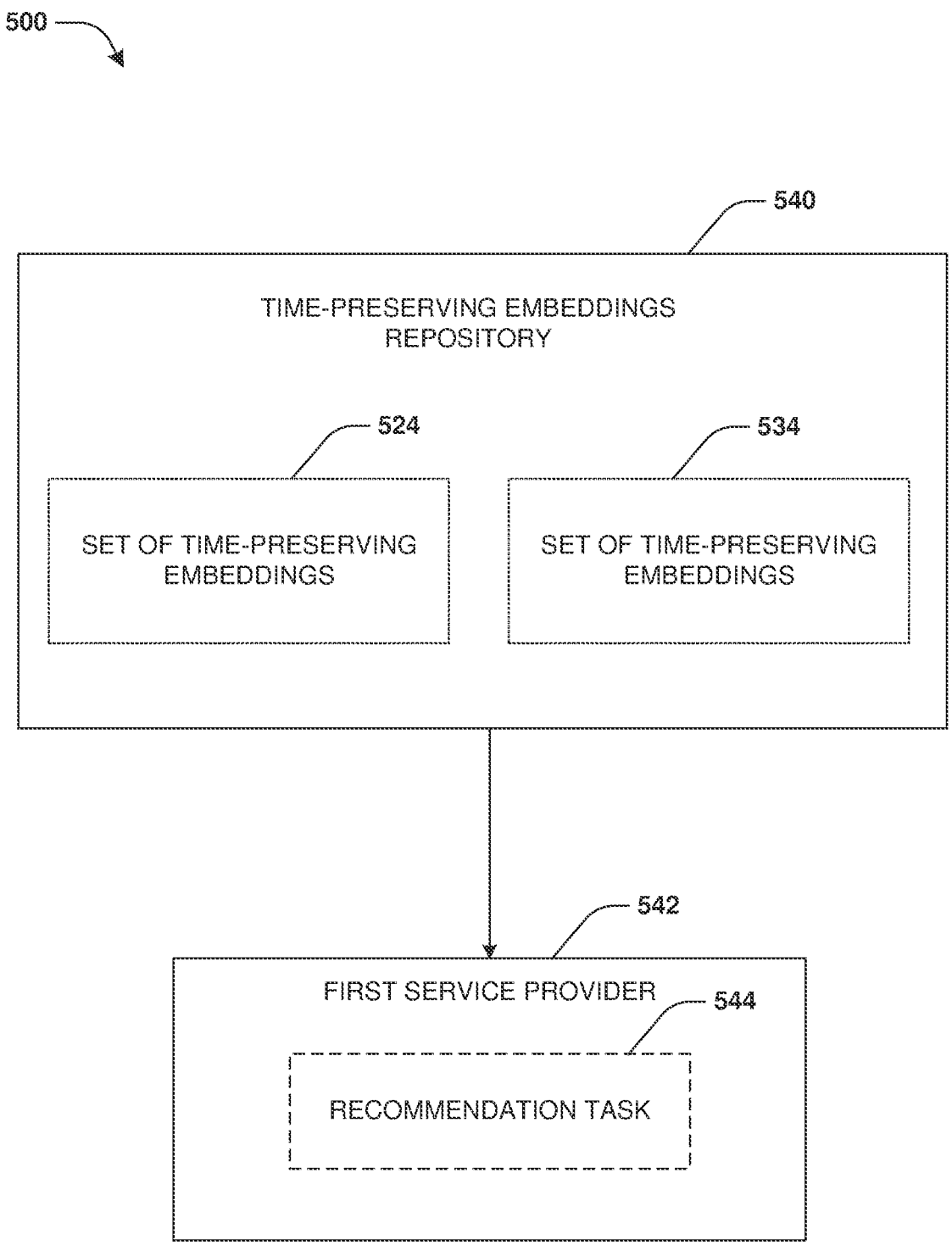
FIG. 5D is a component block diagram illustrating an example system for generating time-preserving embeddings, where time-preserving embeddings are utilized for performing a task.
Figure 5E:
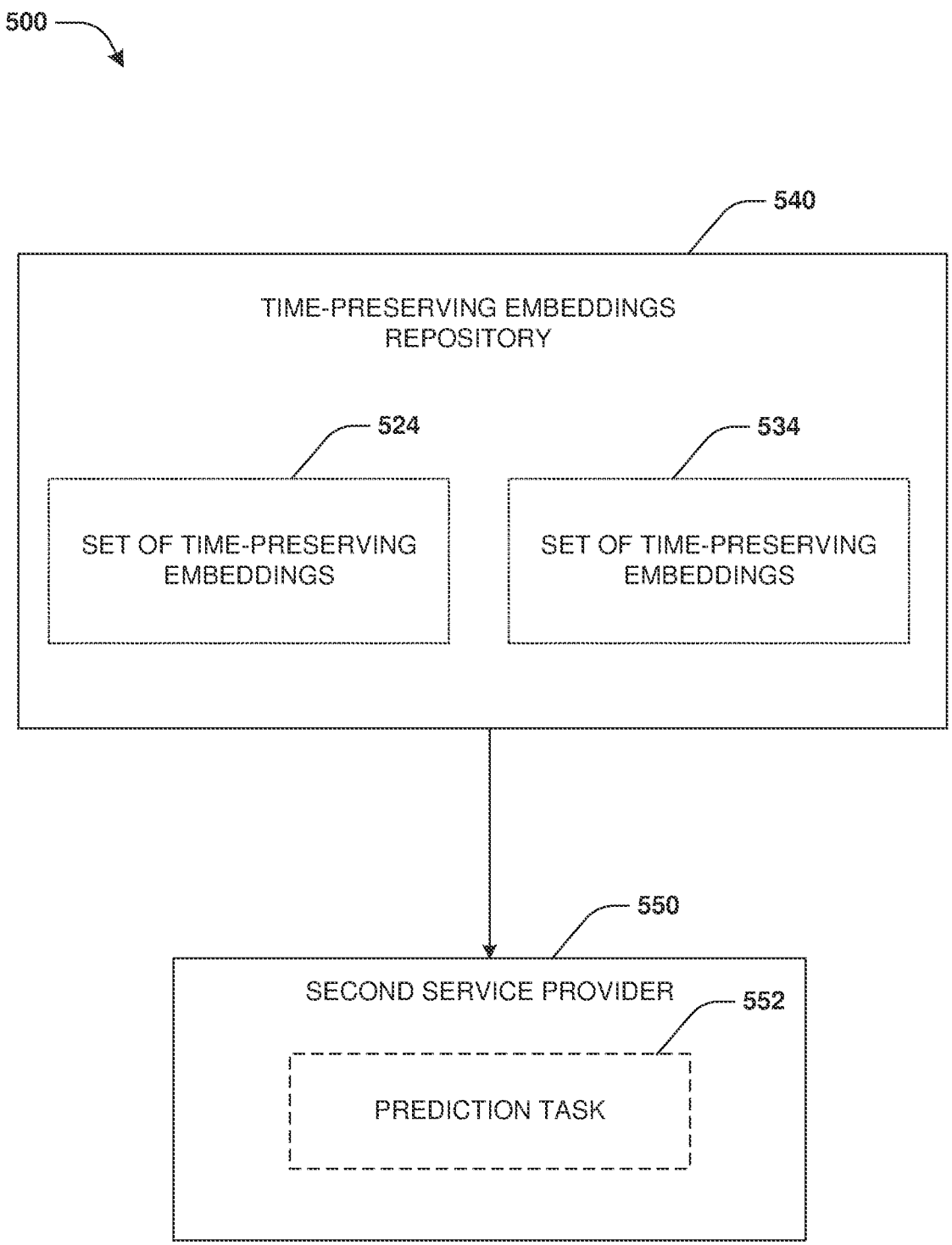
FIG. 5E is a component block diagram illustrating an example system for generating time-preserving embeddings, where time-preserving embeddings are utilized for performing a task.
Figure 5F:
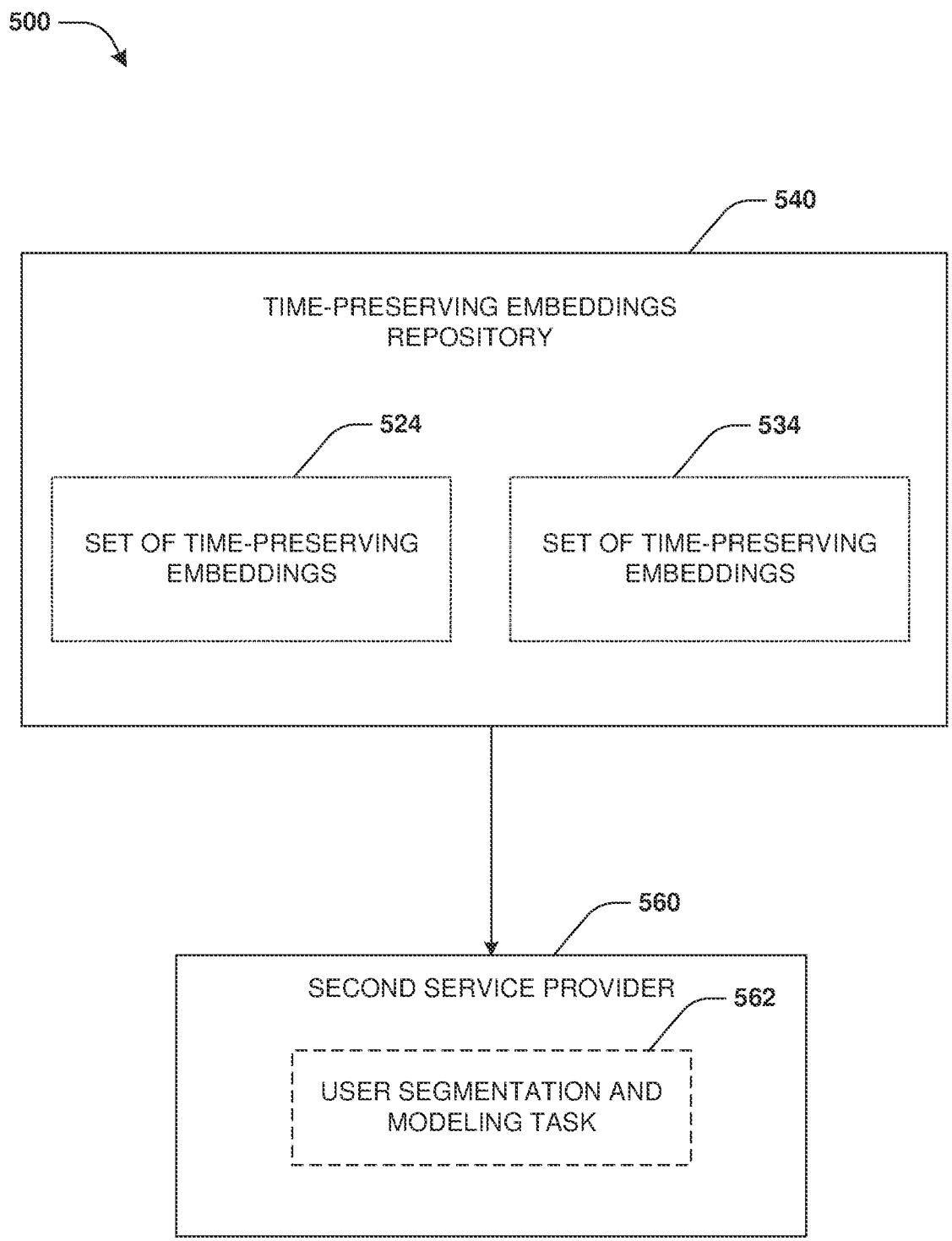
FIG. 5F is a component block diagram illustrating an example system for generating time-preserving embeddings, where time-preserving embeddings are utilized for performing a task.

During operation 412 of FIG. 4, time-preserving embeddings, such as the set of time-preserving embeddings 524 and/or the set of time-preserving embeddings 534, may be utilized to perform various different types of tasks having different task types. For example, the time-preserving embeddings may be made accessible to a variety of different service providers for perform the different types of tasks, such as predicting a user interest, predicting a likelihood a user will perform an action, generating a recommendation to provide a user, predicting a likelihood that a user will interact with content, user segmentation, user lookalike modeling, etc. In some embodiments, a first service provider 542 may selectively retrieve a first set of time-preserving embeddings from a time-preserving embeddings repository 540 for performing a recommendation task 544, as illustrated by FIG. 5D. In some embodiments, a second service provider 550 may selectively retrieve a second set of time-preserving embeddings from the time-preserving embeddings repository 540 for performing a prediction task 552, as illustrated by FIG. 5E. In some embodiments, a third service provider 560 may selectively retrieve a third set of time-preserving embeddings from the time-preserving embeddings repository 540 for performing a user segmentation and modeling task 562, as illustrated by FIG. 5F.

Figure 6:
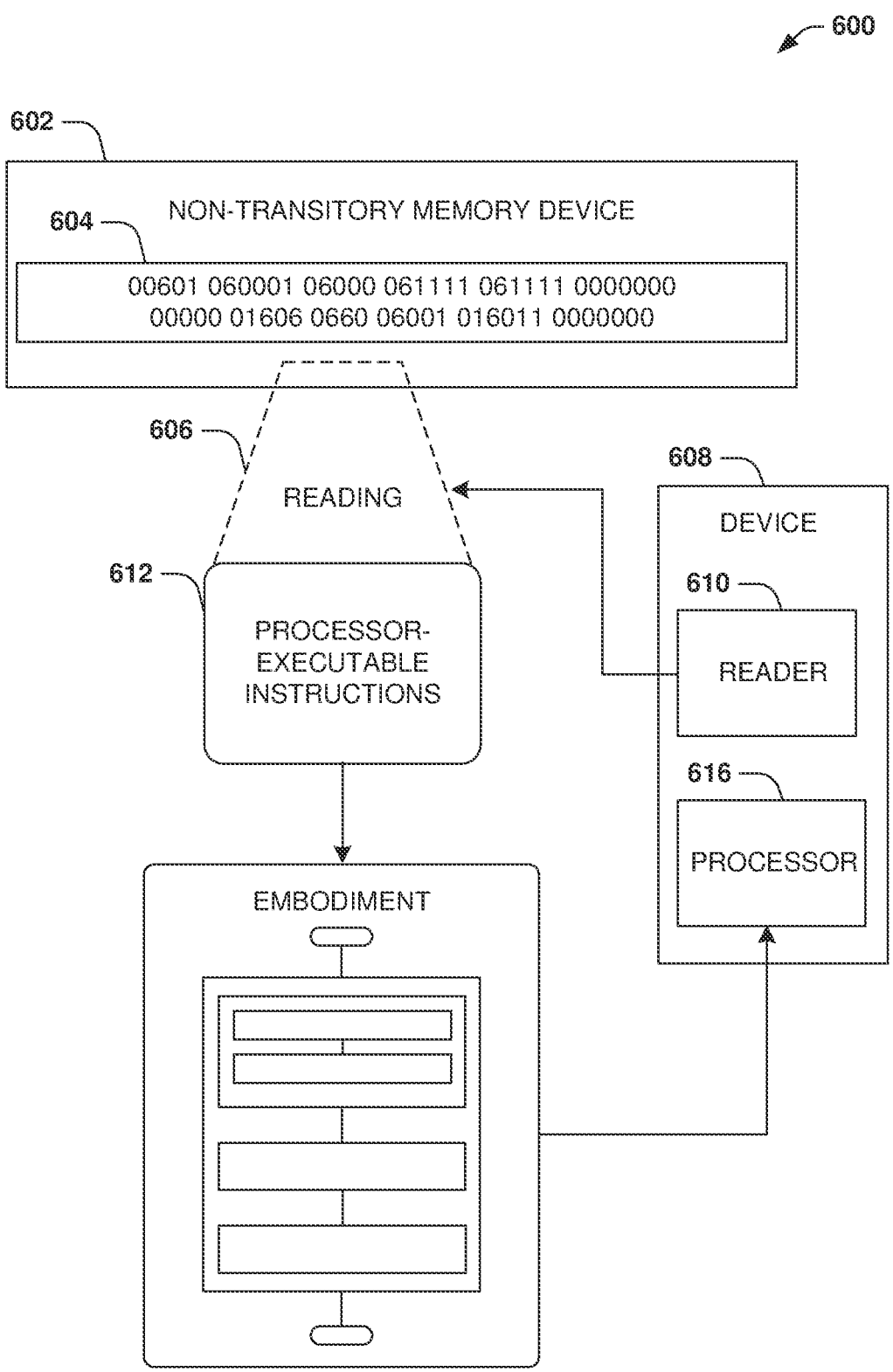
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random-dom access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIG. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
      generating user trails of activities performed by users;
      identifying frequencies at which the activities were performed;
      assigning indices to a set of activities identified from the activities as having frequencies above a threshold, wherein the assigning comprises assigning a first index to a first activity having a first frequency above the threshold and assigning a second index to a second activity having a second frequency above the threshold;
      mapping activity descriptions of the set of activities to the indices to generate a vocabulary, wherein the mapping comprises mapping a first activity description to the first index assigned to the first activity and mapping a second activity description to the second index assigned to the second activity; and
      training a model using the user trails, timestamps of the activities, and the vocabulary to learn a set of time-preserving embeddings.

2. The method of claim 1, wherein the training comprises:
   generating a set of learned parameters based upon the training of the model.

3. The method of claim 1, wherein the training comprises:
   training the model to generate the set of time-preserving embeddings as user embeddings describing the users.

4. The method of claim 1, wherein the training comprises:
   training the model to generate the set of time-preserving embeddings as activity embeddings describing the activities.

5. The method of claim 1, wherein the training comprises:
   transforming, using unsupervised training, the user trails into fix-length numerical vectors as the set of time-preserving embeddings representing collections of temporally distributed user events.

6. The method of claim 1, wherein the training comprises:
   utilizing a temporal score function to encode temporal information into the set of time-preserving embeddings, wherein the temporal score function is utilized to map a time of event to a score.

7. The method of claim 6, wherein the temporal score function utilizes a parameterized sigmoid function that outputs the score based upon a sigmoid and one or more trained parameters.

8. The method of claim 1, comprising:
   utilizing the set of time-preserving embeddings to perform a task corresponding to at least one of predicting a user interest, predicting a likelihood a user will perform an action, generating a recommendation to provide the user, or predicting a likelihood that the user will interact with content.

9. The method of claim 1, comprising:
   utilizing a set of learned parameters, derived from the training of the model, to perform a task corresponding to at least one of predicting a user interest, predicting a likelihood a user will perform an action, generating a recommendation to provide the user, or predicting a likelihood that the user will interact with content.

10. A non-transitory machine readable medium having stored thereon processor-executable instructions that when executed cause performance of operations, the operations comprising:
    generating user trails of activities performed by users;
    generating a vocabulary based upon mappings of activity descriptions to indices, wherein the indices are mapped to a set of activities identified from the activities as having frequencies above a threshold, wherein the mappings comprise (i) a first mapping of a first activity description to a first index assigned to a first activity having a first frequency above the threshold and (ii) a second mapping of a second activity description to a second index assigned to a second activity having a second frequency above the threshold;

training a model using the user trails, timestamps of the activities, and the vocabulary to learn a set of time-preserving embeddings; and utilizing the set of time-preserving embeddings to perform a first task.

11. The non-transitory machine readable medium of claim 10, wherein the operations comprise:

utilizing the set of time-preserving embeddings to perform a second task having a task type different than a task type of the first task.

12. The non-transitory machine readable medium of claim 10, wherein the operations comprise:

generating a set of learned parameters based upon the training of the model; and utilizing the set of learned parameters to perform the first task.

13. The non-transitory machine readable medium of claim 12, wherein the operations comprise:

utilizing the set of learned parameters to embed incoming activities.

14. The non-transitory machine readable medium of claim 13, wherein the operations comprise:

in response to determining that an incoming activity is a trending activity performed a threshold number of times by a threshold number of users, including the trending activity within the vocabulary for a subsequent training of the model.

15. The non-transitory machine readable medium of claim 13, wherein the operations comprise:

in response to determining that an incoming activity is not within the vocabulary, refraining from adding the incoming activity into the vocabulary until a subsequent update of the vocabulary.

16. The non-transitory machine readable medium of claim 12, wherein the operations comprise:

utilizing the set of learned parameters to embed a user.

17. The non-transitory machine readable medium of claim 16, wherein the operations comprise:

embedding activities, of a user trail of the user, that are in the vocabulary; and considering activities, of the user trail, that are not in the vocabulary during a subsequent update of the vocabulary.

18. A computing device comprising:

a processor; and memory comprising processor-executable instructions that when executed by the processor cause performance of operations, the operations comprising:

generating a vocabulary based upon mappings of activity descriptions, of activities performed by users, to indices, wherein the indices are mapped to a set of activities identified from the activities as having frequencies above a threshold, wherein the mappings comprise (i) a first mapping of a first activity description to a first index assigned to a first activity having a first frequency above the threshold and (ii) a second mapping of a second activity description to a second index assigned to a second activity having a second frequency above the threshold;

training a model using user trails of the activities, timestamps of the activities, and the vocabulary to learn a set of time-preserving embeddings; and utilizing the set of time-preserving embeddings to perform a task.

19. The computing device of claim 18, wherein the set of time-preserving embeddings comprise representations of users, wherein a set of users with activity histories within a similarity threshold are in a neighboring proximity within an embedding space.

20. The computing device of claim 18, wherein the set of time-preserving embeddings comprise token based URL embeddings.

* * * * *